(12) United States Patent
Follmer et al.

(10) Patent No.: US 6,636,428 B2
(45) Date of Patent: Oct. 21, 2003

(54) MECHANICAL CARRIER PLATE

(75) Inventors: Lee Follmer, San Diego, CA (US);
Jeffrey Todd Sayles, San Diego, CA (US); Akbar Paydar, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 5 days.

(21) Appl. No.: 10/003,650

(22) Filed: Nov. 2, 2001

(65) Prior Publication Data

US 2003/0086247 A1 May 8, 2003

(51) Int. Cl.[7] .............................. H05K 7/14; H05K 9/00
(52) U.S. Cl. ..................... 361/797; 361/753; 361/759; 361/800; 361/801; 361/816; 174/35 R; 174/35 GC; 211/41.17
(58) Field of Search ................................. 361/728, 730, 361/759, 692, 753, 796, 797, 800–801, 816, 818; 174/35 R, 35 GC; 211/41.17; 206/709

(56) References Cited

U.S. PATENT DOCUMENTS

| | | | | | |
|---|---|---|---|---|---|
| 4,821,145 | A | * | 4/1989 | Corfits et al. | 361/692 |
| 5,062,801 | A | * | 11/1991 | Roos | 439/61 |
| 5,162,675 | A | | 11/1992 | Olsen et al. | |
| 5,190,480 | A | | 3/1993 | Chau et al. | |
| 5,342,211 | A | | 8/1994 | Broeksteeg | |
| 5,818,696 | A | * | 10/1998 | Knoop | 361/730 |
| 6,421,252 | B1 | * | 7/2002 | White et al. | 361/797 |

* cited by examiner

Primary Examiner—Jayprakash N. Gandhi
(74) Attorney, Agent, or Firm—Meyertons Hood Kivlin Kowert & Goetzel, P.C.; B. Noël Kivlin

(57) ABSTRACT

In one embodiment of the present invention, a carrier plate assembly for use in an electrical system is disclosed, comprising a carrier plate capable of securing at least one system board. Each system board is capable of being inserted and removed from the carrier plate assembly without disturbing another system board connected to the carrier plate assembly. The carrier plate assembly is capable of releasable attachment to the electronic system and is capable of being inserted and removed from the electronic system without disturbing another assembly connected to the electronic system.

28 Claims, 5 Drawing Sheets

MECHANICAL CARRIER PLATE

BACKGROUND OF THE INVENTION

1. Field of the Invention

This invention relates generally to the placement of components within an electrical assembly, and, more particularly, to the placement, support and operation of system boards and input/output (I/O) boards within a computer system.

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

The desire to increase computing capabilities has led to the development of processing systems comprising multiple system board sets, where each system board set is capable of having its own central processing unit (CPU), memory and I/O boards such as peripheral component interface (PCI) bus controllers. To increase/decrease the computing capabilities of these processing systems, the number of board sets may be varied accordingly. That is, board sets may be added to or removed from the processing system to accommodate the needs of the users. Adding and removing multiple boards within the system has proven somewhat problematic in that large numbers of electrical contacts need to be reliably and repeatedly made. Miscoupling of these connections can lead to improper operation or even electrical or physical damage to the board sets.

There is thus a need for an efficient way of connecting and supporting the components of the system board set and enabling the connection of the system board set to the processing system.

SUMMARY OF THE INVENTION

In one aspect of the present invention, an apparatus for use in an electrical system is provided for comprising a carrier plate assembly capable of securing at least one system board. Each system board is capable of being inserted and removed from the carrier plate assembly without disturbing another system board connected to the carrier plate assembly. The carrier plate assembly is capable of releasable attachment to the electronic system and is capable of being inserted and removed from the electronic system without disturbing another assembly connected to the electronic system.

In another aspect of the instant invention, a method of installing system boards within an electronic system is disclosed. The method comprises providing a carrier plate assembly. The carrier plate assembly is then connected to the electronic system. At least one system board is inserted into the carrier plate assembly, thereby connecting the system board to the electronic system through the carrier plate assembly.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
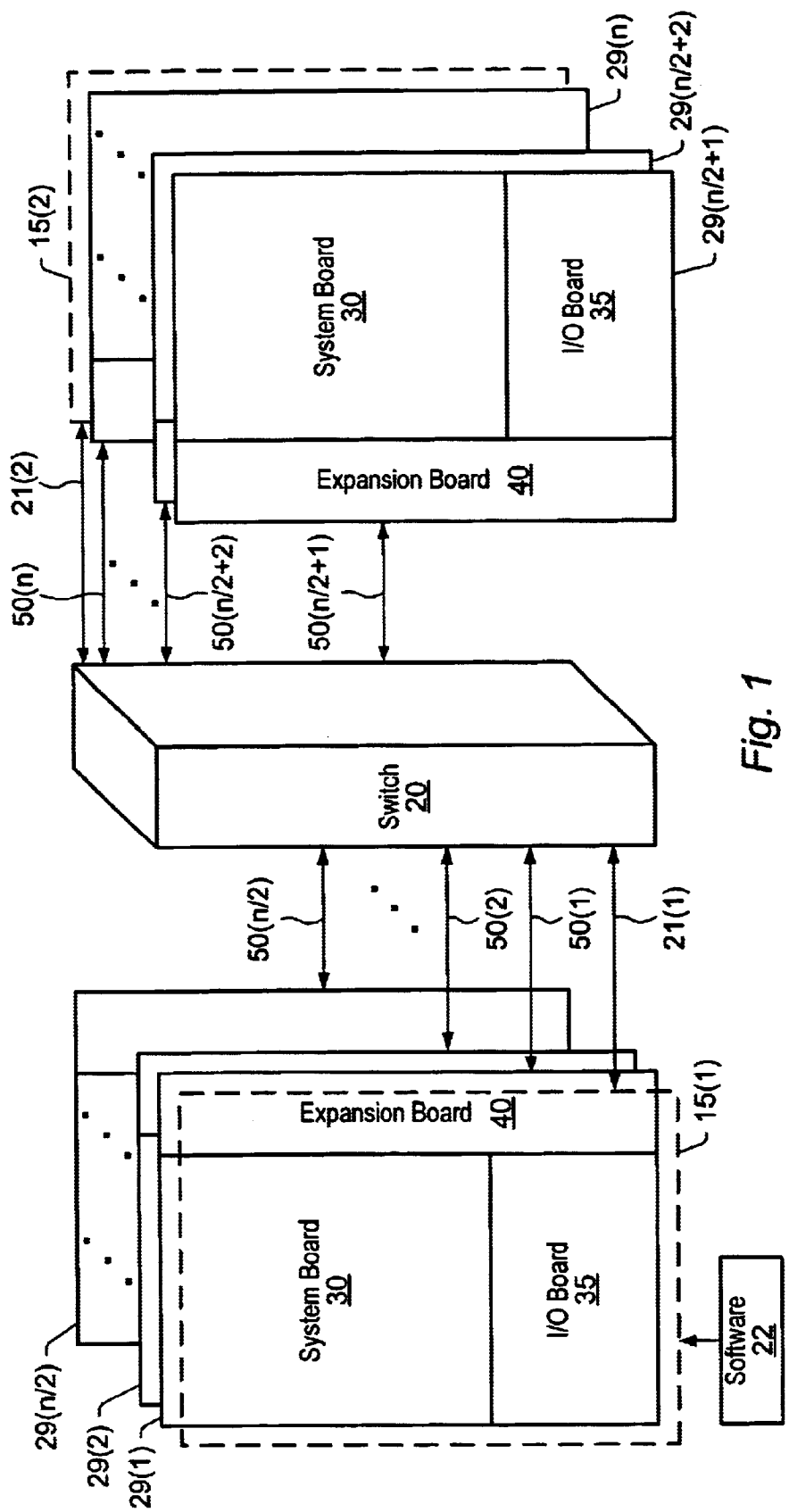
FIG. 1 shows a stylized block diagram of an electronic system in accordance with one embodiment of the present invention.

Referring now to FIG. 1, a block diagram of an electrical system 10 in accordance with one embodiment of the present invention is illustrated. The system 10, in one embodiment, includes a plurality of system control boards 15(1-2) that are coupled to a center plane 20, which can also be referred to as a switch. For illustrative purposes, lines 21(1-2) are utilized to show that the system control boards 15(1-2) are coupled to the center plane 20, although it should be appreciated that, in other embodiments, the boards 15(1-2) may be coupled to the center plane 20 in any of a variety of ways, including by edge connectors, cables, or other available interfaces.

The system 10, in one embodiment, includes a plurality of system board sets 29(1-n) that are coupled to the center plane 20, as indicated by lines 50(1-n). The system board sets 29(1-n) may be coupled to the center plane 20 in one of several ways, including edge connectors or other available interfaces. The center plane 20 can serve as a communications conduit for the plurality of system board sets 29(1-n), half of which may be connected on one side of the center plane 20 and the other half on the opposite side of the center plane 20. The center plane 20 and any attached control boards and/or system boards can be referred to as the electronic system 10.

The center plane 20, in one embodiment, may be a 18×18 crossbar switch that allows system board sets 29(1-n) and system control boards 15(1-2) to communicate, if desired. Thus, the center plane 20 may allow the two system control boards 15(1-2) to communicate with each other or with other system board sets 29(1-n), as well as allow the system board sets 29(1-n) to communicate with each other. As described in more detail below, in accordance with one embodiment of the present invention, the system control boards 15(1-2) use a standard communications protocol connection through the center plane 20 to communicate with one or more of the system board sets 29(1-n).

The system board sets 29(1-n), in one embodiment, comprise one or more boards, including a system board 30, I/O board 35, and an expansion board 40. The system board 30 may include processors, as well as memories, for executing, in one embodiment, applications, including portions of an operating system. The I/O board 35 may manage I/O cards, such as peripheral component interface cards and optical cards, that are installed in the system 10. The expander board 40, in one embodiment, generally acts as a multiplexer (e.g., 2:1 multiplexer) to allow both the system and I/O boards 30, 35 to interface with the center plane 20, which, in some instances, may have only one slot for interfacing with both boards 30, 35.

Figure 2:
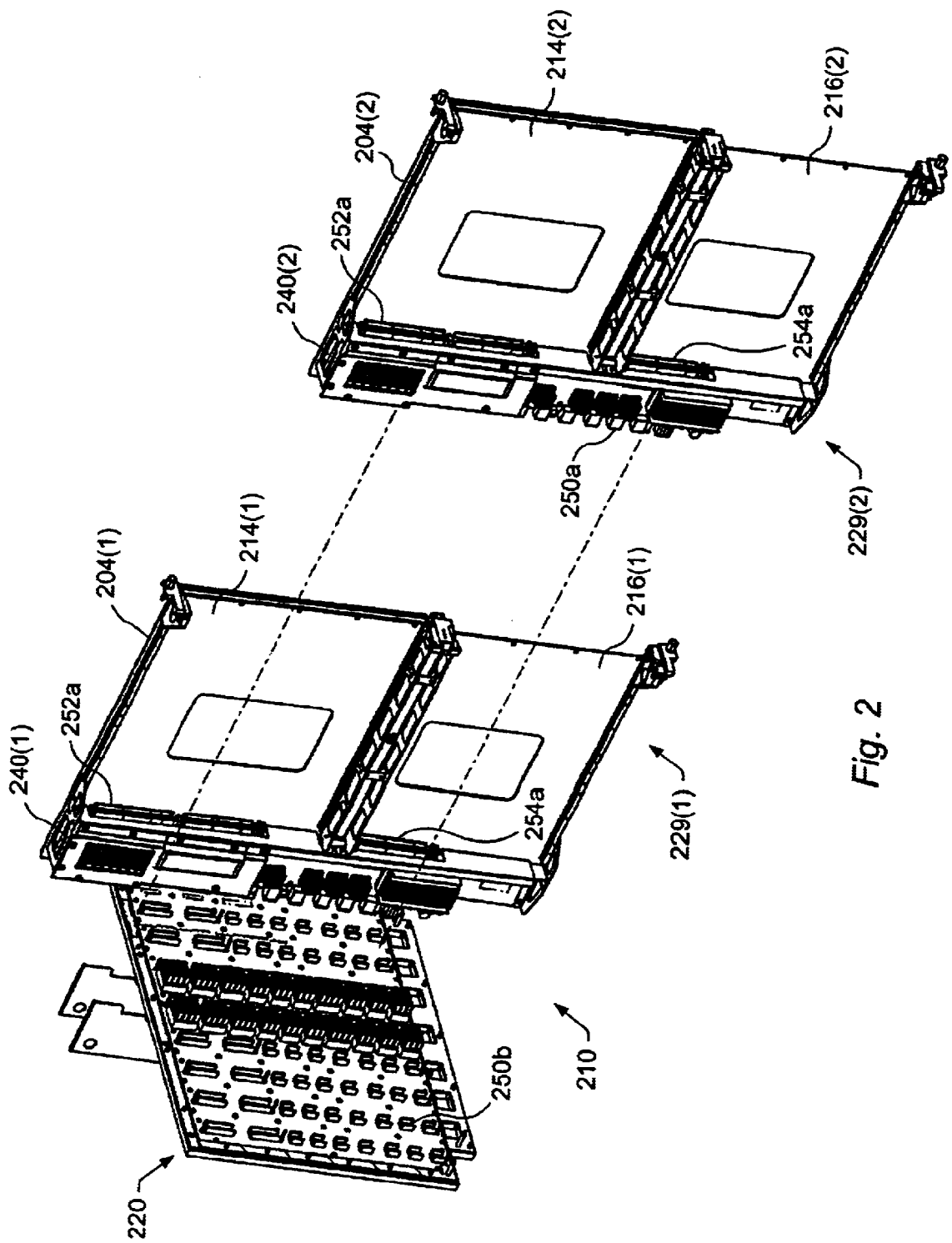
FIG. 2 shows a perspective view of one embodiment of the present invention.

FIG. 2 shows a perspective view of a first expander board 240(1) inserted into the enter plane 220 and shows a second expander board 240(2) that is aligned with the center plane 220 and ready for insertion. Connectors 250a on the expander boards 240 are capable of releasable attachment to the matching connectors 250b on the center plane 220. Connectors 252a, 254a on the expander boards 240 are able to receive system boards (not shown) that releasably connect to the expander board 240. The expander boards 240 can be attached to a carrier plate assembly 204 that provides support to the system boards (not shown). The connectors 250a on the expander boards 240 provide releasable connection of the carrier plate 204 to the center plane 220.

A plurality of expander boards 240 can be connected to the center plane 220, and in one particular embodiment nine system board sets 229 can be connected to each side of the center plane 220. In one embodiment of the invention, each carrier plate assembly 204 within a system board set 229 is capable of being inserted and removed from the center plane 220 without disturbing another carrier plate assembly 204 or system board set 229 connected to the center plane 220. In one embodiment of the invention, the carrier plate assembly 204 is capable of being inserted and removed from the center plane 220 without the use of tools. In one particular embodiment, once the carrier plate assembly 204 is inserted into the center plane 220, it is secured in place by a conventional means, such as, for example, with the use of a retaining screw or bolt. The removal of the carrier plate 204 from the center plane 220 in this particular embodiment would comprise the release of the retaining means prior to the removal of the carrier plate assembly 204.

Figure 3:
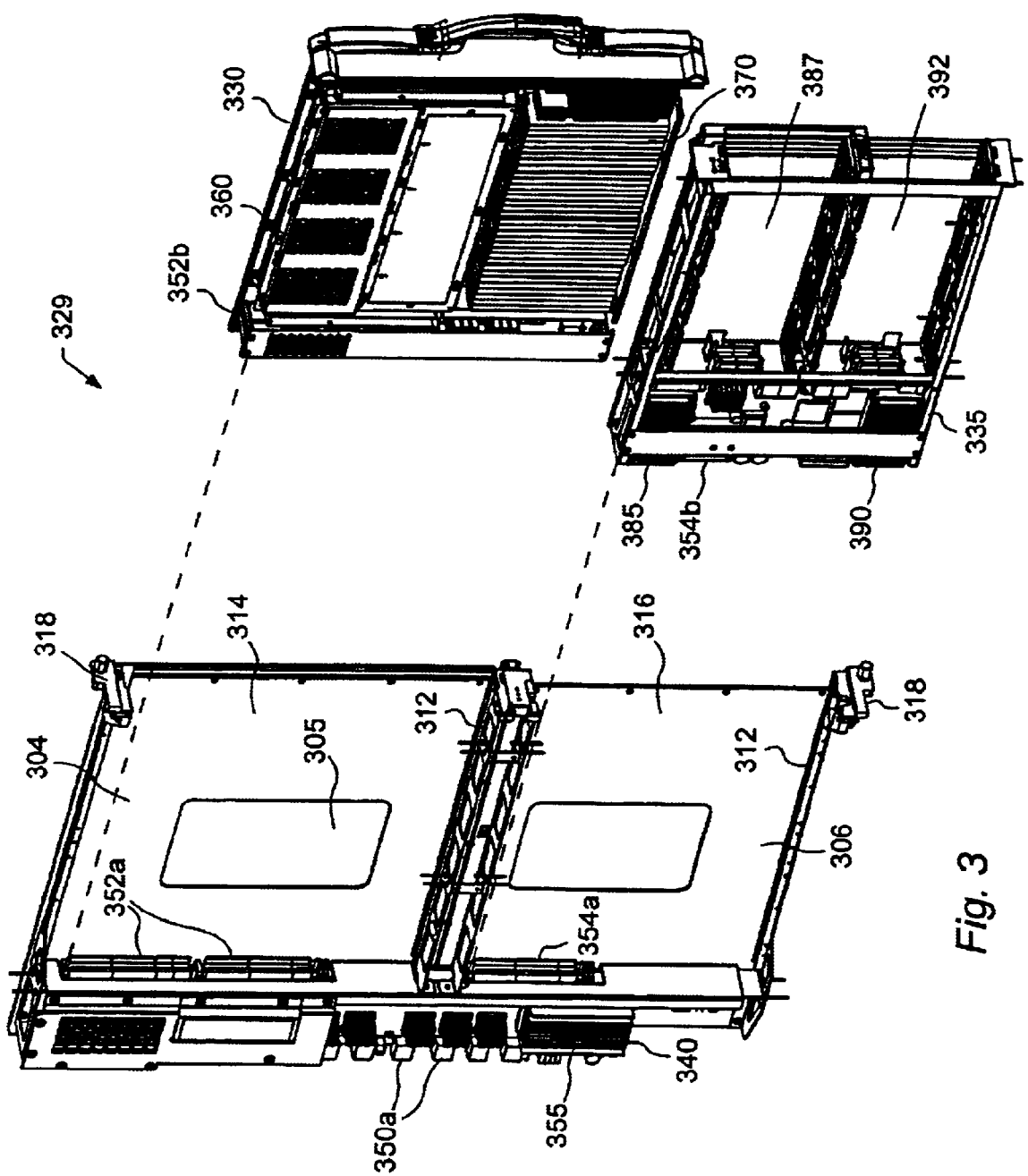
FIG. 3 shows a perspective view of one embodiment of the present invention.

Referring now to FIG. 3, in one embodiment a system board set 329 comprises an expander board 340 coupled to a carrier plate assembly 304. The carrier plate assembly 304 has a carrier plate 306, and protruding from the carrier plate 306 are guide rails 312 that define a first board slot 314 and a second board slot 316. The first board slot 314 is capable of receiving a first system board 330 and the second board slot 316 is capable of receiving a second system board 335. The guide rails 312 are capable of providing vertical and horizontal support to the system boards 330, 335 and facilitating the installation and removal of the boards 330, 335 to the expander board 340.

Attached to the guide rails 312 are retaining members 318 that are capable of retaining the system boards 330, 335 within the respective board slots 314, 316. The retaining members 318 can comprise clips, latches, screws or other types of retaining means. One or more apertures 305 within the carrier plate 306 provide a path for airflow through the carrier plate assembly 304 to assist in the cooling of the system boards 330, 335. In one embodiment of the invention the retaining members 318 can comprise retaining means that enable tool-free installation and removal of the system boards 330, 335. In another embodiment of the invention the retaining members 318 can comprise retaining means that enable tool free installation of the system boards 330, 335, while requiring the release of a locking mechanism for the removal of the system boards 330, 335. The release of a locking mechanism can comprise an action utilizing a tool, for example, a quarter turn operation with the use of a Phillips head screwdriver to release a lever, followed by the tool free removal of the system boards 330, 335.

The phrase "tool-free" installation and/or removal means that the connectors or retaining elements can be engaged and/or disengaged without the use of a tool, for example, a screwdriver or a wrench. A person of ordinary dexterity can perform the installation and removal. Examples of connectors and retaining elements that can provide tool-free installation and removal include flexible snaps and tabs, thumbscrews, spring loaded retaining rings, and the like.

The expander board 340 can comprise connectors 350a that physically and electrically couple the expander board 340 to the center plane 20 of the electrical system 10. The expander board 340 can also comprise one or more power sources 355. The expander board 340 can comprise connectors and/or retaining elements that provide for tool-free installation and removal of the system boards 330, 335 within the expander board 340. Connectors 352a, 354a on the expander board 340 and connectors 352b, 354b on the system boards 330, 335 provide the needed physical support to secure the system boards 330, 335 to the expander board 340 in addition to providing the required electrical connections. The connectors 350a–b, 352a–b, 354a–b are illustrated as edge type connectors, however it should be appreciated that the couplings may be accomplished by one of several ways, including, but not limited to, using edge connectors, cables, or other available interfaces.

The first system board 330 can comprise a CPU/Memory board having a plurality of processors 360 and a plurality of memory units 370. The second system board 335 can comprise an I/O board having the capability of receiving a plurality of I/O cards. The I/O board 335 includes a controller 385 for managing one or more of the PCI cards that may be installed in one or more PCI slots 387. In the illustrated embodiment, the I/O board 335 also includes a second controller 390 for managing one or more I/O cards that may be installed in one or more I/O slots 392. The I/O slots 392 may receive optics cards, network cards, and the like.

The embodiment shown in FIG. 3 enables the vertical placement of the first system board 330 within board slot 314 located above the second system board 335 within board slot 316, both of which are aligned substantially parallel to the carrier plate assembly 304. The expander board 340 is attached to the carrier plate assembly 304 such that connectors 352b on the first system board 330 can engage with mating connectors 352a on the expander board 340, and connectors 354b on the second system board 335 can engage with mating connectors 354a on the expander board 340. The board connectors 352a–b, 354a–b can provide physical support and serve as retaining elements for the system boards 330, 335 connection to the expander board 340. The board connectors 352a–b, 354a–b can also comprise guides that assist in aligning the system boards 330, 335 with the expander board 340. The expander board 340 is attached to the carrier plate assembly 304 such that connectors 350a on the expander board 340 extend beyond the carrier plate assembly 304 and can engage with mating connectors 250b on the electronic system 220.

Figure 4:
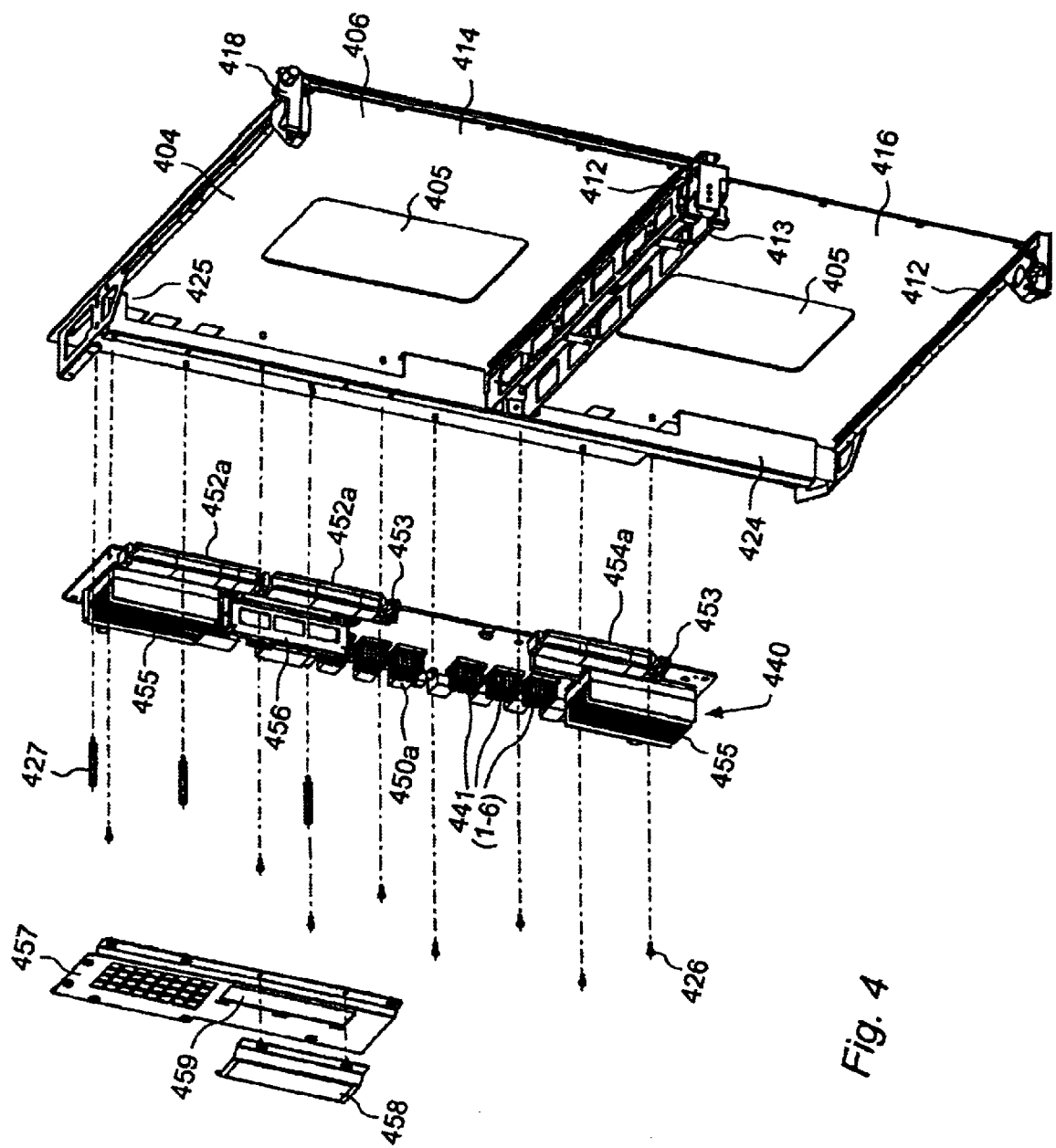
FIG. 4 shows a partially exploded view of a portion of the embodiment illustrated in FIGS. 2 and 3.

Referring now to FIG. 4, a partially exploded view of the carrier plate assembly 404 shows the expander board 440 in relation to the carrier plate assembly 404. Protruding from the carrier plate 406 are guide rails 412 that define a first board slot 414 and a second board slot 416. The guide rails 412 in conjunction with a center bracket 413 provide a stiffening support in the horizontal direction to the carrier plate assembly 404. Attached to the guide rails 412 are retaining members 418 that are capable of retaining the system and I/O boards (not shown) within the housing board slots 414, 416.

A frame member 424 attached to the carrier plate 406 provides stiffening support in the vertical direction to the carrier plate assembly 404 and also provides protection to the various units on the expander board 440. Openings 425 in the frame member 424 permit the connectors 452a, 454a on the expander board 440 to be accessible for engagement with connectors on the system and I/O boards (not shown). The frame member 424 can also serve as a shield for electromagnetic interference (EMI). The expander board 440 is attached to the carrier plate assembly 404 utilizing connectors 426 that are typically self-tapping screws but can also be bolts, rivets and other type connectors well known and used in the art. Connection extenders 427 can be used for proper alignment of a cover plate 457 to the expander board 440. The frame member 424 can also be used to attach the expander board 440 and/or the cover plate 457 to the carrier plate assembly 404.

The expander board 440 comprises connectors 450a that connect the expander board 440 to the electronic system 220. The expander board 440 can also comprise one or more power sources 455 and scalable random access memory (SRAM) 456. The cover plate 457 provides protection to a portion of the expander board 440, such as one of the power sources 455 and the SRAM units 456. A removable access cover 458 is attached over the opening 459 in the cover plate 457 to provide access to the SRAM units 456 without requiring the removal of the entire cover plate 457. The cover plate 457 and the access cover 458 are connected to the carrier plate assembly 404 using conventional connectors 426 and connection extenders 427. The cover plate 457 and access cover 458 can likewise serve as shields for EMI.

Figure 5:
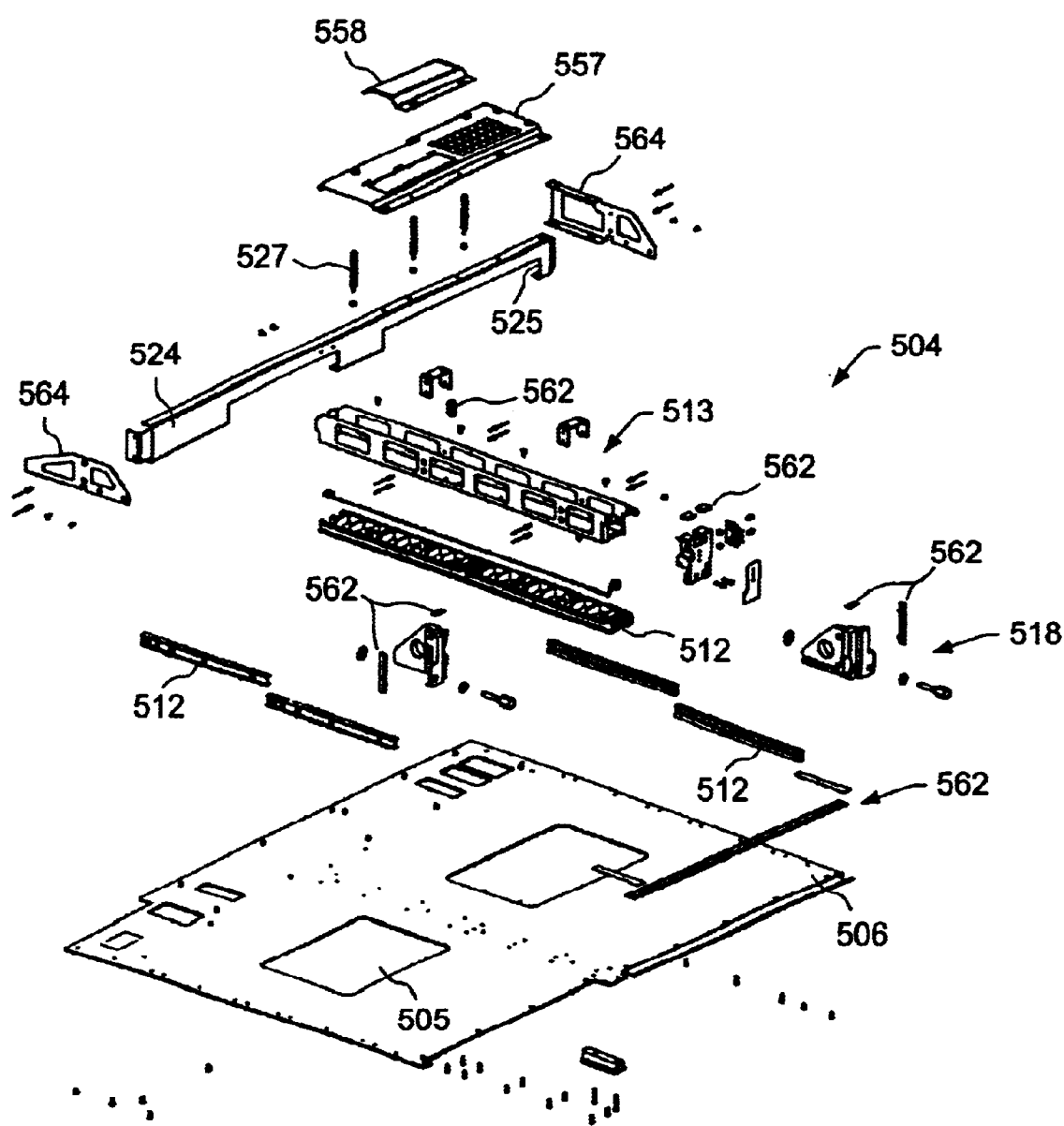
FIG. 5 shows an exploded view of an embodiment of the invention.

FIG. 5 is an exploded view of one illustrative embodiment of the carrier plate assembly 504 showing the relative positions and means of attachment for the carrier plate 506, guide rails 512, center bracket 513, retaining members 518, frame member 524, cover plate 557, and access cover 558. Gaskets 562 that can provide shielding from EMI can be incorporated within the carrier plate assembly 504 design. The carrier plate 506, frame member 524, cover plate 557, and access cover 558 can also be designed to serve as EMI shielding elements. Stiffening brackets 564 can be used to connect the frame member 524 to the carrier plate 506. The stiffening brackets 564 provide support to the carrier plate assembly 504 in the horizontal direction and when connected to the frame member 524 they form an I-beam type structure that provides stiffening support in both the vertical and horizontal directions. The guide rails 512 in conjunction with the center bracket 513 provide a stiffening support in the horizontal direction to the carrier plate assembly 504.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A carrier plate assembly for use in an electronic system, comprising:
    a carrier plate capable of supporting at least one system board within the carrier plate assembly, wherein each system board is capable of being inserted and removed from the carrier plate assembly without disturbing another system board connected to the carrier plate assembly;
    an expander board coupled to the carrier plate, wherein the expander board receives the system board when the system board is inserted into the carrier plate assembly; and
    wherein the carrier plate assembly is capable of releasable attachment to the electronic system, wherein the electronic system comprises a switch, wherein the switch is electronically coupled to the expander board when the carrier plate is attached to the electronic system,
    wherein the switch is configured to receive the carrier plate assembly on one side of the switch and configured to receive a separate carrier plate assembly on an opposing side of the
    wherein the carrier plate assembly is capable of being inserted and removed from the electronic system without disturbing another assembly connected to the electronic system.

2. The carrier plate of claim 1, wherein the carrier plate is capable of releasably retaining the at least one system board within the carrier plate assembly.

3. The carrier plate of claim 1, further comprising:
    at least one retaining element, the retaining element capable of releasably retaining the at least one system board within the carrier plate assembly.

4. The carrier plate assembly of claim 3, wherein the retaining element is attached to one or more guide rails attached to the carrier plate assembly.

5. The carrier plate of claim 1, further comprising:
    at least one aperture, the at least one aperture capable of communicating airflow from a first side of the carrier plate to a second side of the carrier plate to assist in cooling of the at least one system board within the carrier plate assembly.

6. The carrier plate of claim 1, further comprising:
    at least one guide rail, the at least one guide rail capable of guiding and supporting the at least one system board within the carrier plate assembly.

7. The carrier plate of claim 1, wherein the carrier plate assembly is capable of supporting and releasably retaining at least one system board in a vertical position within the carrier plate assembly and connecting the at least one system board to the expander board.

8. The carrier plate of claim 7, wherein the carrier plate assembly and expander board are capable of securing and connecting to at least one system board; the carrier plate assembly, the expander board and at least one system board forming a system board set capable of connecting to the electronic system.

9. The carrier plate of claim 8, wherein the system board set is capable of releasable attachment to the electronic system.

10. The carrier plate of claim 9, wherein the system board set is capable of being inserted and removed from the electronic system without disturbing another system board set connected to the electronic system.

11. The carrier plate of claim 9, wherein the system board set is capable of being inserted into the electronic system without the use of tools.

12. The carrier plate of claim 9, wherein the system board set is capable of being connected perpendicular to the electronic system.

13. The carrier plate of claim 9, wherein the system board set comprises one CPU/Memory board and one I/O board.

14. The carrier plate of claim 9, wherein the carrier plate assembly and expander board are capable of connecting to and retaining a first system board and a second system board; the carrier plate assembly, expander board and each system board being aligned vertically and the system boards and carrier plate aligned parallel to each other.

15. The carrier plate of claim 14, the carrier plate assembly of claim 14, wherein the first system board is located above the second system board.

16. The carrier plate of claim 1, wherein each system board is capable of being inserted into the carrier plate assembly without the use of tools.

17. The carrier plate of claim 1, wherein the at least one system board is one of a CPU/Memory board, I/O board, PCI bus controller and optical link controller.

18. The carrier plate of claim 1, wherein the carrier plate assembly comprises at least one electromagnetic shielding element.

19. The carrier plate of claim 1, wherein the carrier plate assembly comprises at least one electromagnetic shielding gasket.

20. The carrier plate assembly of claim 1, further comprising a cover plate coupled to the expander board with a removable access cover coupled to the cover plate to provide access to at least one component on the expander board without requiring removal of the cover plate.

21. A carrier plate assembly for an electronic system, comprising:

a carrier plate comprising a first board slot and a second board slot, the carrier plate assembly capable of securing at least one system board, wherein the at least one system board is coupled to an expander board coupled to the carrier plate;

wherein the carrier plate assembly is capable of releasably supporting system boards within the board slots in a vertical position, the first board slot located above the second board slot;

wherein each system board is capable of being inserted and removed from the board slots without the use of tools; and wherein the assembly is capable of releasable attachment to a switch coupled to the electronic system and is capable of being inserted and removed from the electronic system without disturbing another assembly connected to the electronic system, wherein the switch is configured to receive the carrier plate assembly on one side of the switch and configured to receive a separate carrier plate assembly on an opposing side of the switch.

22. The carrier plate assembly of claim 21, wherein the assembly is capable of being inserted into the electronic assembly without the use of tools.

23. The carrier plate assembly of claim 21, wherein the carrier plate further comprises guide rails capable of guiding and supporting the at least one system board within the assembly.

24. The carrier plate assembly of claim 21, wherein the carrier plate further comprises a frame member capable of providing stiffening support to the carrier plate assembly.

25. The carrier plate assembly of claim 21, wherein the carrier plate further comprises at least one electromagnetic shielding element.

26. A method of installing system boards within a electronic system, comprising:

providing a carrier plate assembly comprising an expander board;

connecting the carrier plate assembly into the electronic system by coupling the expander board to a switch coupled to the electronic system; and inserting at least one system board into the carrier plate assembly, thereby connecting the system board to the electronic system through the carrier plate assembly, wherein the switch is configured to receive the carrier plate assembly on one side of the switch and configured to receive a separate carrier plate assembly on an opposing side of the switch.

27. The method of claim 26, further comprising:

aligning guides on the carrier plate assembly with the at least one system board;

releasably securing the at least one system board within the carrier plate assembly.

28. The method of claim 26, further comprising:

restricting electromagnetic interference emissions from the at least one system board.

* * * * *

UNITED STATES PATENT AND TRADEMARK OFFICE
CERTIFICATE OF CORRECTION

PATENT NO. : 6,636,428 B2
DATED : October 21, 2003
INVENTOR(S) : Follmer et al.

It is certified that error appears in the above-identified patent and that said Letters Patent is hereby corrected as shown below:

Column 6,
Line 27, please change "opposing side of the" to -- opposing side of the switch; --.

Signed and Sealed this

Fourth Day of May, 2004

JON W. DUDAS
*Acting Director of the United States Patent and Trademark Office*